(12) United States Patent  
Chauvel et al.

(10) Patent No.: US 8,190,861 B2  
(45) Date of Patent: May 29, 2012

(54) MICRO-SEQUENCE BASED SECURITY MODEL

(75) Inventors: Gerard Chauvel, Antibes (FR); Gilbert Cabillic, Brece (FR); Jean-Philippe Lesot, Etrelles (FR); Dominique D'Inverno, Villeneuve-Loubet (FR); Eric Badi, Cagnes-sur-Mer (FR); Serge Lasserre, Plascassier (FR)

(73) Assignee: Texas Instruments Incorporated, Dallas, TX (US)

( * ) Notice: Subject to any disclaimer, the term of this patent is extended or adjusted under 35 U.S.C. 154(b) by 1234 days.

(21) Appl. No.: 11/677,367

(22) Filed: Feb. 21, 2007

(65) Prior Publication Data

US 2008/0134322 A1 Jun. 5, 2008

(30) Foreign Application Priority Data

Dec. 4, 2006 (EP) .................................. 06291876

(51) Int. Cl.
*G06F 9/00* (2006.01)
(52) U.S. Cl. ........................................... 712/220; 726/21
(58) Field of Classification Search .................. 712/220; 726/21
See application file for complete search history.

(56) References Cited

U.S. PATENT DOCUMENTS

| | | | |
|---|---|---|---|
| 6,546,546 B1* | 4/2003 | Van Doorn ..................... | 717/114 |
| 6,941,552 B1* | 9/2005 | Beadle et al. ..................... | 718/1 |
| 2004/0024798 A1* | 2/2004 | Chauvel ........................ | 707/206 |
| 2004/0024988 A1 | 2/2004 | Chauvel | |
| 2004/0024989 A1* | 2/2004 | Chauvel et al. ................. | 712/41 |
| 2004/0024990 A1 | 2/2004 | Chauvel | |
| 2004/0024991 A1 | 2/2004 | Chauvel | |
| 2004/0024997 A1 | 2/2004 | Chauvel | |
| 2004/0024999 A1 | 2/2004 | Chauvel | |
| 2004/0040017 A1* | 2/2004 | Kershenbaum et al. ...... | 717/158 |
| 2004/0059893 A1 | 3/2004 | Chauvel | |
| 2004/0078522 A1 | 4/2004 | Lasserre | |
| 2004/0078523 A1* | 4/2004 | Chauvel et al. ................ | 711/128 |
| 2004/0078550 A1 | 4/2004 | Chauvel | |
| 2004/0153885 A1 | 8/2004 | Chauvel | |
| 2004/0260904 A1* | 12/2004 | Chauvel et al. ................ | 711/170 |
| 2005/0033945 A1* | 2/2005 | Chauvel et al. ................ | 712/226 |
| 2006/0026126 A1* | 2/2006 | Cabillic ............................ | 707/2 |
| 2006/0026312 A1* | 2/2006 | Chauvel ........................... | 710/23 |
| 2006/0026322 A1* | 2/2006 | Chauvel et al. ................ | 710/260 |
| 2006/0026391 A1* | 2/2006 | Chauvel et al. ................ | 712/209 |
| 2006/0026396 A1* | 2/2006 | Lesot et al. .................... | 712/223 |
| 2006/0026400 A1* | 2/2006 | Chauvel et al. ................ | 712/226 |
| 2006/0026403 A1* | 2/2006 | Chauvel ....................... | 712/226 |
| 2006/0026405 A1* | 2/2006 | Chauvel ........................ | 712/227 |
| 2006/0026407 A1* | 2/2006 | Chauvel ........................ | 712/228 |
| 2006/0026565 A1* | 2/2006 | Cabillic et al. ................. | 717/118 |
| 2006/0026566 A1* | 2/2006 | Cabillic et al. ................. | 717/118 |
| 2006/0026574 A1* | 2/2006 | Lesot et al. .................... | 717/140 |

\* cited by examiner

*Primary Examiner* — Idriss N Alrobaye
(74) *Attorney, Agent, or Firm* — Ronald O. Neerings; Wade James Brady, III; Frederick J. Telecky, Jr.

(57) ABSTRACT

A method and system for implementing a micro-sequence based security model in a processor. More particularly, micro-sequences and JSM hardware resources are employed to construct a security model invisible to applications, and when memory constraints are in place, extend a complex security model in JSM code by implementing a micro-sequence security trigger. The method includes micro-sequence based security policy that determines whether an instruction accesses a privileged resource associated with a processor and when not already in privilege mode and not executing a micro-sequence, the micro-sequence based security policy is applied to the instruction to control access to the privileged resource according to the security policy.

26 Claims, 4 Drawing Sheets

| | | | |
|---|---|---|---|
| R0 | GENERAL PURPOSE (GP) | | |
| R1 | GENERAL PURPOSE (GP) | | |
| R2 | GENERAL PURPOSE (GP) | | |
| R3 | GENERAL PURPOSE (GP) | | |
| R4 | PROGRAM COUNTER (PC) | | |
| R5 | GENERAL PURPOSE/LOCAL VARIABLE POINTER (LV) | | |
| R6 | STACK POINTER (SP) | | |
| R7 | TOP OF STACK (TOS) | | |
| R8 | GENERAL PURPOSE/ADDRESS INDEX 0 (AI0) | | |
| R9 | GENERAL PURPOSE/ADDRESS INDEX 1 (AI1) | | |
| R10 | GENERAL PURPOSE (GP) | | |
| R11 | GENERAL PURPOSE (GP) | | |
| R12 | MICRO-PROGRAM COUNTER (MICRO-PC) | | |
| R13 | GENERAL PURPOSE (GP) | | |
| R14 | GENERAL PURPOSE/INDIRECT REGISTER INDEX (IRI) | | |
| R15 | STATUS AND CONTROL (ST) | "U" MICRO-SEQUENCE ACTIVE BIT | "P" PRIVILEGE MODE BIT |

MICRO-SEQUENCE BASED SECURITY MODEL

CROSS-REFERENCE TO RELATED APPLICATIONS

This application claims priority to EPO Patent Application No. 06291876.8, filed on Dec. 4, 2006, incorporated herein by reference.

BACKGROUND INFORMATION

1. Technical Field

Various embodiments of the present disclosure relate to processors and, more particularly, to the use of micro-sequences and Java stack machine (JSM) resources to implement a security model, with or without memory constraints.

2. Background Information

Java™ is a programming language that, at the source code level, is similar to object oriented programming languages such as C++. Java™ language source code is compiled into an intermediate representation based on a plurality of "bytecodes" that define specific tasks. In some implementations, the bytecodes are further compiled to machine language for a particular processor. In order to speed the execution of Java™ language programs, some processors are specifically designed to execute some of the Java™ bytecodes directly.

Many times, a processor that directly executes Java™ bytecodes is paired with a general purpose processor so as to accelerate Java™ program execution in a general or special purpose machine. In systems where processors are paired, both Java code and non-Java code may be executed by the processors. When a system update or application may be downloaded, security is desirable to prevent corruption of resources by the downloaded updates or applications with minimal consumption of available memory.

SUMMARY

The problems noted above are solved in large part by a method and system for implementing a micro-sequence based security model. Specifically, "micro-sequences" in conjunction with JSM hardware resources may be employed to construct a security model generally invisible to applications, and when memory constraints are in place, extend a complex security model in JSM code by implementing a "micro-sequence" security trigger. The JSM processor may execute, in addition to the Java™ bytecodes, a second instruction set other than Java™ bytecodes comprising register-based and memory-based operations rather than stack-based operations. This second instruction set complements the Java instruction set and, accordingly, may be referred to as a complementary instruction set architecture ("C-ISA"). By complementary, it is meant that some complex Java bytecodes may be replaced by a "micro-sequence" comprising C-ISA instructions. The JSM thus comprises a stack-based architecture for direct execution of Java™ bytecodes, combined with a register-based architecture for direct execution of memory-based micro-sequences of C-ISA instructions. As referred to herein, the term "micro-sequence based" refers to a security policy that is either implemented in a micro-sequence, or in a subroutine of bytecodes, the execution of which is started by the execution of a micro-sequence. By applying a micro-sequence based security policy, the security policy is rendered inaccessible to user applications.

In some disclosed embodiments, a method comprises defining a micro-sequence based security policy. The method also comprises determining whether an instruction accesses a privileged resource. When not executing a micro-sequence and not already in privilege mode, the method further comprises applying the micro-sequenced based security policy to control access to the privileged resource according to the security policy.

In other disclosed embodiments, a processor comprises fetch logic that retrieves instructions from memory and decode logic coupled to the fetch logic. The processor also comprises an active program counter selected as either a first program counter or a second program counter. Additionally, the processor comprises a security manager logic that, based on an attempt by an instruction to access a privileged resource, applies a micro-sequence based security policy to control access to the privileged resource when the processor is not already in privilege mode and not executing a micro-sequence. The active program counter switches between the first and second program counters while the security manager applies the security policy.

In yet other disclosed embodiments, a system comprises a first processor and a second processor coupled to said first processor. The second processor comprises fetch logic that retrieves instructions from memory and decode logic coupled to said fetch logic. The second processor also comprises an active program counter selected as either a first program counter or a second program counter and a privileged resource. The second processor additionally comprises a security manager logic that, based on an attempt by an instruction to access a privileged resource, applies a micro-sequence based security policy to control access to the privileged resource when the processor is not already in privilege mode and not executing a micro-sequence. The active program counter switches between the first and second program counters while the security manager applies the security policy.

Notation and Nomenclature

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

The terms "asserted" and "not asserted" are used herein to refer to Boolean conditions. An asserted state need not necessarily be a logical 1 or a high voltage state, and thus could equally apply to an asserted being a logical 0 or a low voltage state. Thus, in some embodiments an asserted state may be a logical 1 and a not-asserted state may be a logical 0, with de-assertion changing the state from a logical 1 to a logical 0. Equivalently, an asserted state may be a logic 0 and a not-asserted state may a logical 1 with a de-assertion being a change from a logical 0 to a logical 1.

For security reasons, at least some processors provide two levels or modes of operating privilege: the user mode that provides a first level of privilege for user programs; and a higher level of privilege, referred to as the privilege mode, for use by the operating system.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be exemplary of those embodiments, and not intended to intimate that the scope of the disclosure, is limited to those embodiments.

Moreover, the various embodiments were developed in the context of processors executing Java™ bytecodes, and thus the description is related to the developmental context; however, the various embodiments find application outside the Java environment, such as Microsoft's ".NET" (pronounced "dot net") framework or in programs written in C and C++, and thus the description in relation to a Java environment should not be construed as a limitation as to the breadth of the disclosure.

The subject matter disclosed herein is directed to a programmable electronic device such as a processor. The processor described herein is particularly suited for executing Java™ bytecodes, or comparable code. Java™ itself is particularly suited for embedded applications as it is a relatively "dense" language, meaning that on average each instruction or bytecode may perform a large number of functions compared to other programming languages. The dense nature of Java™ is of particular benefit for portable, battery-operated devices with small amounts of memory. The reason, however, for executing Java™ code is not material to this disclosure or the claims which follow. Further, the processor advantageously has one or more features that permit the execution of the Java™ code to be accelerated.

In an open, Java-based platform, updates to system software or new user applications may be downloaded. When executed, such updates or user applications may attempt to carry out privileged operations, such as accessing privileged devices (e.g., memory), scheduling processes, and the like. A security policy is implemented in various embodiments to grant permission to some applications, while denying permission to others. As described below, the security policy may be implemented using micro-sequences, enabling privileged activities on a per-process basis, in a manner invisible to the application seeking to carry out a privileged operation. In this way, the security policy is safe from corruption from downloaded applications. The details of the security policy are not relevant here beyond the manner in which the security policy is implemented—a security policy of any complexity may be implemented, limited only by creativity and/or memory limitations. The processor described herein may be used in a wide variety of electronic systems (e.g., cell phones).

Furthermore, when limited memory storage is available for micro-sequence instructions, the security as described above may be extended using a JSM subroutine executed in PC mode that may only be called from within a micro-sequence. A JSM subroutine may implement the security policy in as complex, and memory-consuming, JSM instructions (C-ISA or Java) as necessary for the security policy desired. When the JSM subroutine has executed, another instruction returns the execution flow to the micro-sequence. Such a micro-sequence thus has the ability to transfer a privilege code execution flow in PC mode (i.e., outside of privilege mode), minimizing the memory needed for storing micro-sequences, while providing the desired level and complexity of security.

Figure 1:
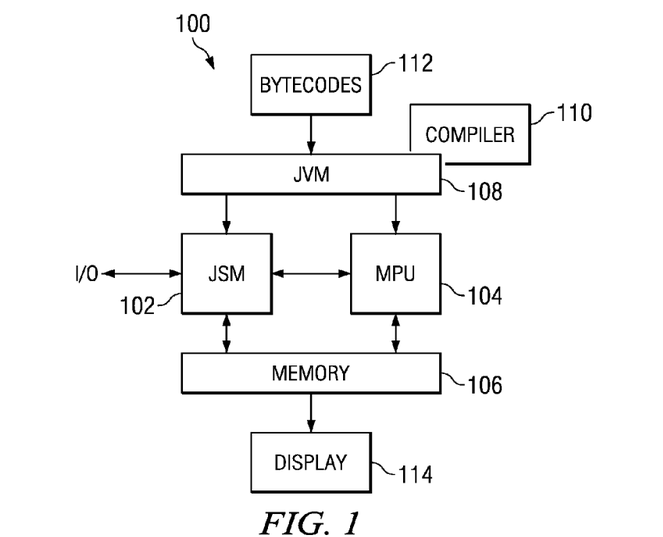
FIG. 1 shows a diagram of a system in accordance with embodiments of the invention.

FIG. 1 shows a system 100 in accordance with embodiments of the invention. As shown, the system may comprise at least two processors 102 and 104. Processor 102 may be referred to for purposes of this disclosure as a Java Stack Machine ("JSM") and processor 104 may be referred to as a Main Processor Unit ("MPU"). System 100 may also comprise memory 106 coupled to both the JSM 102 and MPU 104. At least a portion of the memory 106 may be shared by both processors, and if desired, other portions of the memory 106 may be designated as private to one processor or the other. System 100 also comprises a Java Virtual Machine ("JVM") 108, compiler 110, and a display 114. The JVM 108 may comprise a combination of software and hardware. The software may comprise the compiler 110 and the hardware may comprise the JSM 102. The JVM may comprise a class loader, bytecode verifier, garbage collector, and a bytecode interpreter loop to interpret the bytecodes that are not executed on the JSM processor 102. Other components (not specifically shown) may be included as desired for various applications.

Java™ language source code is converted or compiled to a series of bytecodes 112, with each individual one of the bytecodes referred to as an "opcode." Bytecodes 112 may be provided to the JVM 108, possibly compiled by compiler 110, and provided to the JSM 102 and/or MPU 104 for execution. In accordance with some embodiments of the invention, the JSM 102 may execute at least some Java™ bytecodes directly. When appropriate, however, the JVM 108 may also request the MPU 104 to execute one or more Java™ bytecodes not executed or executable by the JSM 102. In addition to executing compiled Java™ bytecodes, the MPU 104 also may execute non-Java instructions. The MPU 104 may thus also host an operating system ("O/S") (not specifically shown) which performs various functions such as system memory management, system task management that schedules the software aspects of the JVM 108 and most or all other native tasks running on the system, such as management of the display 114, and receiving input from input devices (not specifically shown). Java™ code, whether executed on the JSM 102 or MPU 104, may be used to perform any one of a variety of applications such as multimedia, games or web based applications in the system 100, while non-Java™ code, which may comprise the O/S and other native applications, may still run on the system on the MPU 104.

Most Java™ bytecodes perform stack-based operations. For example, an "IADD" (integer add) Java™ opcode pops two parameters (of integer type) off the top of the stack, adds them together, and pushes the sum back on the stack (also of integer type). A "simple" opcode is one in which the JSM 102 may perform an immediate operation either in a single cycle (e.g., an IADD opcode) or in several cycles (e.g., "DUP2_X2"). A "complex" opcode is one in which several memory accesses may be required to be made within the JVM data structure for various verifications (e.g., NULL pointer, array boundaries).

A JSM processor 102 in accordance with embodiments of the invention may execute, in addition to the Java™ bytecodes, a second instruction set other than Java™ bytecodes. In some embodiments, the second instruction set may comprise register-based and memory-based operations rather than stack-based operations. This second instruction set complements the Java™ instruction set and, accordingly, may be referred to as a complementary instruction set architecture ("C-ISA"). By complementary, it is meant that some complex Java™ bytecodes may be replaced by a "micro-sequence" comprising C-ISA instructions, or stated alternatively, Java™ bytecodes may trigger a micro-sequence that executes another set of instructions to perform the function of the particular opcode. Likewise, in various embodiments a micro-sequence may trigger a series of Java™ bytecodes.

The execution of Java™ code may thus be made more efficient and run faster by replacing some opcodes by more efficient micro-sequences of C-ISA instructions. As such, JSM 102 comprises a stack-based architecture for efficient and accelerated execution of Java™ bytecodes, combined with a register-based architecture for executing register and memory based micro-sequences of C-ISA instructions. Because various data structures described herein are JVM-dependent, and thus may change from one JVM implementation to another, the software flexibility of the micro-sequence provides a mechanism for various JVM optimizations now known or later developed.

Figure 2:
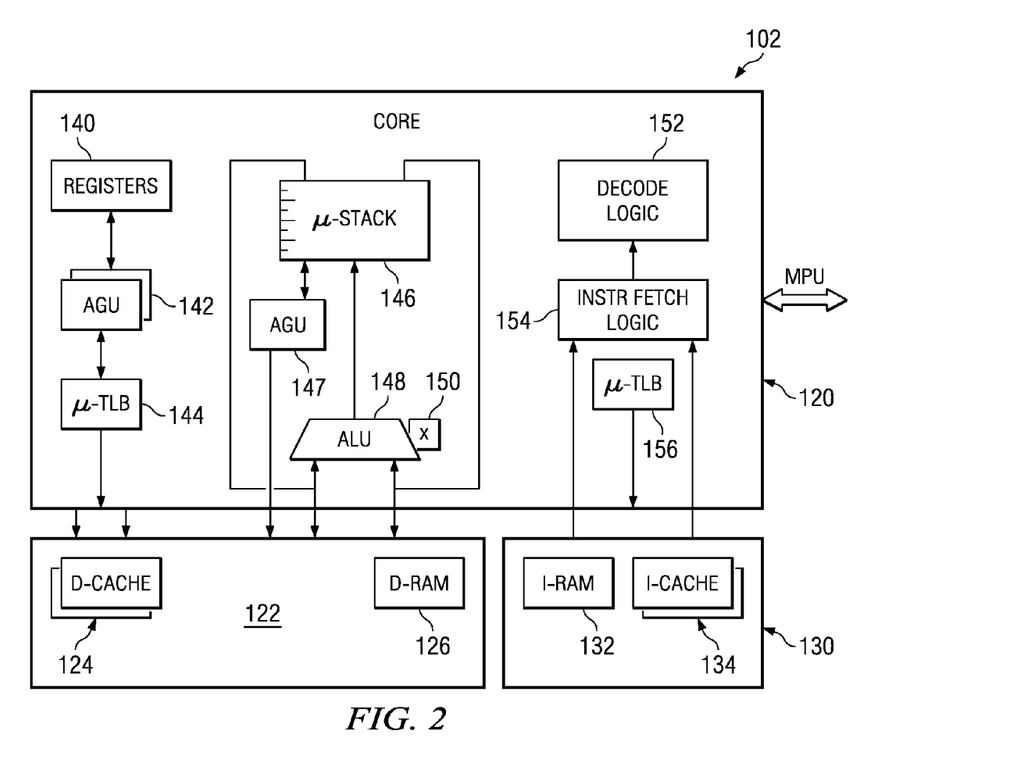
FIG. 2 shows a block diagram of the JSM of FIG. 1 in accordance with embodiments of the invention.

FIG. 2 shows an illustrative block diagram of the JSM 102. As shown, the JSM comprises a core 120 coupled to data storage 122 and instruction storage 130. The components of the core 120 preferably comprise a plurality of registers 140, address generation units ("AGUs") 142 and 147, micro-translation lookaside buffers (micro-TLBs) 144 and 156, a multi-entry micro-stack 146, an arithmetic logic unit ("ALU") 148, a multiplier 150, decode logic 152, and instruction fetch logic 154. Data pointed to by operands of opcodes may be retrieved from data storage 122 or from the micro-stack 146, and processed by the ALU 148. Bytecodes may be fetched from instruction storage 130 by fetch logic 154 and decoded by decode logic 152. The AGUs 142 may be used to calculate addresses for C-ISA instructions based, at least in part, on data contained in the registers 140. AGU 147 couples to the micro-stack 146 and may manage overflow and underflow conditions in the micro-stack 146. The micro-TLBs 144 and 156 perform the function of a cache for the address translation and memory protection information bits that are under the control of the operating system running on the MPU 104.

Java™ bytecodes may also pop data from and push data onto the micro-stack 146, which micro-stack 146 preferably comprises a plurality of gates in the core 120 of the JSM 102. The micro-stack 146 preferably comprises the top n entries of a larger stack that is implemented in data storage 122. Although the value of n may be vary in different embodiments, in accordance with at least some embodiments the size n of the micro-stack may be the top eight entries in the larger, memory-based stack. By implementing the micro-stack 146 hardware in the core 120 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches bytecodes from instruction storage 130, which bytecodes may be decoded by decode logic 152. Because the JSM 102 is configured to process instructions from at least two instruction sets, the decode logic 152 comprises at least two modes of operation, one mode for each instruction set. As such, the decode logic unit 152 may comprise a Java™ mode in which Java™ bytecodes may be decoded, and a C-ISA mode in which micro-sequences of C-ISA instructions may be decoded.

The data storage 122 comprises data cache ("D-cache") 124 and data random access memory ("D-RAM") 126. The stack (excluding the micro-stack 146), arrays and non-critical data may be stored in the D-cache 124, while Java™ local variables, critical data and non-Java™ variables (e.g., C, C++) may be stored in D-RAM 126. The instruction storage 130 may comprise instruction RAM ("I-RAM") 132 and instruction cache ("I-CACHE") 134. The I-RAM 132 may be used for storing opcodes or micro-sequences, and the I-CACHE 134 may be used to store other types of Java™ bytecode and mixed Java™/C-ISA instructions.

Figure 3:
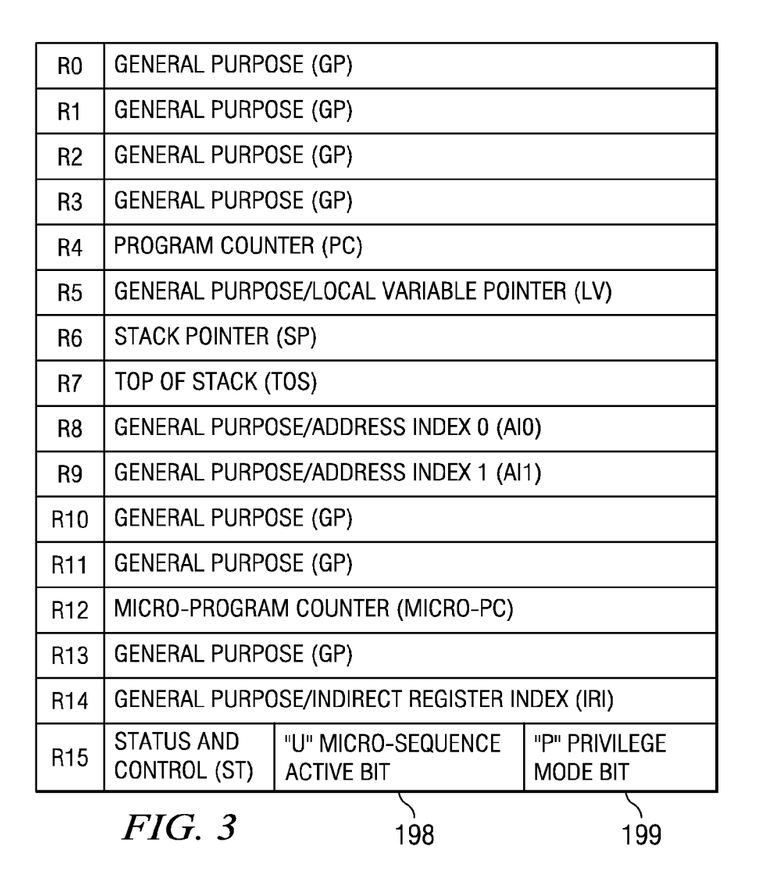
FIG. 3 shows various registers used in the JSM of FIGS. 1 and 2.

Referring now to FIG. 3, the registers 140 may comprise a plurality of registers designated as R0-R15. Registers R0-R3, R5, R8-R11 and R13-R14 may be used as general purposes ("GP") registers for any purpose. Other registers, and some of the GP registers, may be used for specific purposes. For example, registers R4 and R12 may each be used to store program counters, with R4 storing a program counter ("PC") for a stream of bytecodes or C-ISA instructions, and R12 storing a micro-program counter ("micro-PC") for an executing micro-sequence. The use of the PC and micro-PC will be explained in greater detail below. In addition to use as a GP register, register R5 may be used to store the base address of a portion of memory in which Java™ local variables may be stored when used by the current Java™ method. The top of the micro-stack 146 can be referenced by the values in registers R6 and R7, and the top of the micro-stack may have a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"). Register R14 may also be used to hold the indirect register index ("IRI"). Register R15 may be used for status and control of the JSM 102. At least one bit (called the "Micro-sequence-Active" bit or "R15.U" bit, referenced as 198) in status register R15 is used to indicate whether the JSM 102 is executing by way of a micro-sequence. This bit controls in particular, which program counter is used R4 (PC) or R12 (micro-PC) to fetch the next instruction. At least one bit (called the "Privilege Mode" bit or "R15.P" bit, referenced as 199) in status register R15 is used to indicate whether the JSM 102 is executing in privilege mode.

Figure 4:
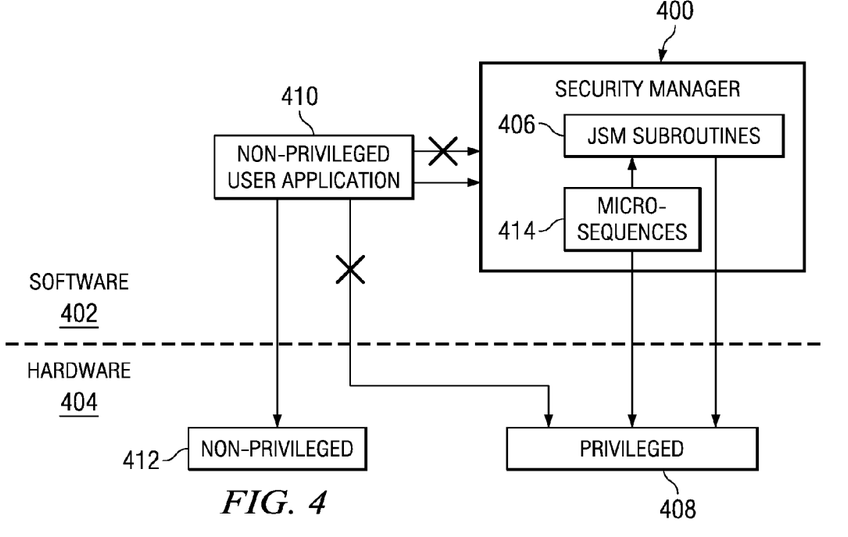
FIG. 4 illustrates a block diagram of a system with a security manager according to various embodiments of the present disclosure.

Referring now to FIG. 4, a block diagram is provided for a system with a security manager according to various embodiments of the present disclosure. The system includes both software 402 and hardware 404. The security manager 400 is implemented using a micro-sequence firmware 414 and a set of JSM subroutines 406. In such a system, the way for a non-privileged application 410 to request a privileged resource 408 is to activate a micro-sequence. Thus, non-privileged applications 410 are compiled for use in the system, and request the activation of micro-sequences to access privileged resources 408. This activation may be performed by bytecodes that are micro-sequenced, or using a trap that activates a micro-sequence. Because security manager 400 can be activated exclusively by micro-sequence, the security policy is isolated from and generally invisible to applications in software 402, making corruption of the security policy (and therefore privileged resources) difficult to impossible. Based on the status register contents (i.e., the bit R15.P and bit R15.U), the hardware 404 can check if an instruction attempts to access a privileged hardware resource 408. The access is permitted if bit R15.U is asserted or if bit R15.P is asserted, otherwise, a hardware exception is generated, and will activate a micro-sequence that detects an illegal use of an instruction and apply a specific treatment. For example, the micro-sequence may consider the application as a fault, and kill the faulting, non-privileged application 410.

When entering a micro-sequence, bit R15.U is asserted, thus access to privileged hardware resource 408 is permitted. When the micro-sequence further calls a JSM subroutine 406 to be executed in PC mode, a specific, privileged JSM instruction (referred to herein as "CALLS" as it results in calling the subroutine) may be used to atomically save the current R15, uPC and PC, and assert bit R15.P and clear bit R15.U. The JSM subroutine 406 is executed in PC mode, and because bit R15.P is asserted, access to privileged hardware resource 408 is permitted. Note that a JSM subroutine can also call another sub-routine using CALLS. At the end of a JSM subroutine 406, a specific, privileged JSM instruction (referred to herein as "RETS" as it results in returning from the subroutine) restore previously saved R15, PC and µPC. Thus, if the subroutine was called from a micro-sequence, bit R15.U will be equal to 1, and bit R15.P will be equal to zero. In this case, the subroutine will return to the micro-sequence execution. When a user application 410 attempts to use a JSM subroutine 406 directly (without activating a micro-sequence), the JSM subroutine 406 is executed with bit R15.P deasserted. Thus, any use of privileged hardware resource 408 will generate a hardware exception to activate a micro-sequence that detects illegal use of an instruction. Access by the non-privileged application 410 to non-privileged resources 412 is permitted regardless of the status of bits R15.P and R15.U.

Implementation of a security model in a micro-sequence based model as in FIG. 4 avoids the need for specialized hardware support or specialized instructions. Furthermore, the security manager 400 can implement any kind or degree of security desired or needed for the system.

Figure 5:
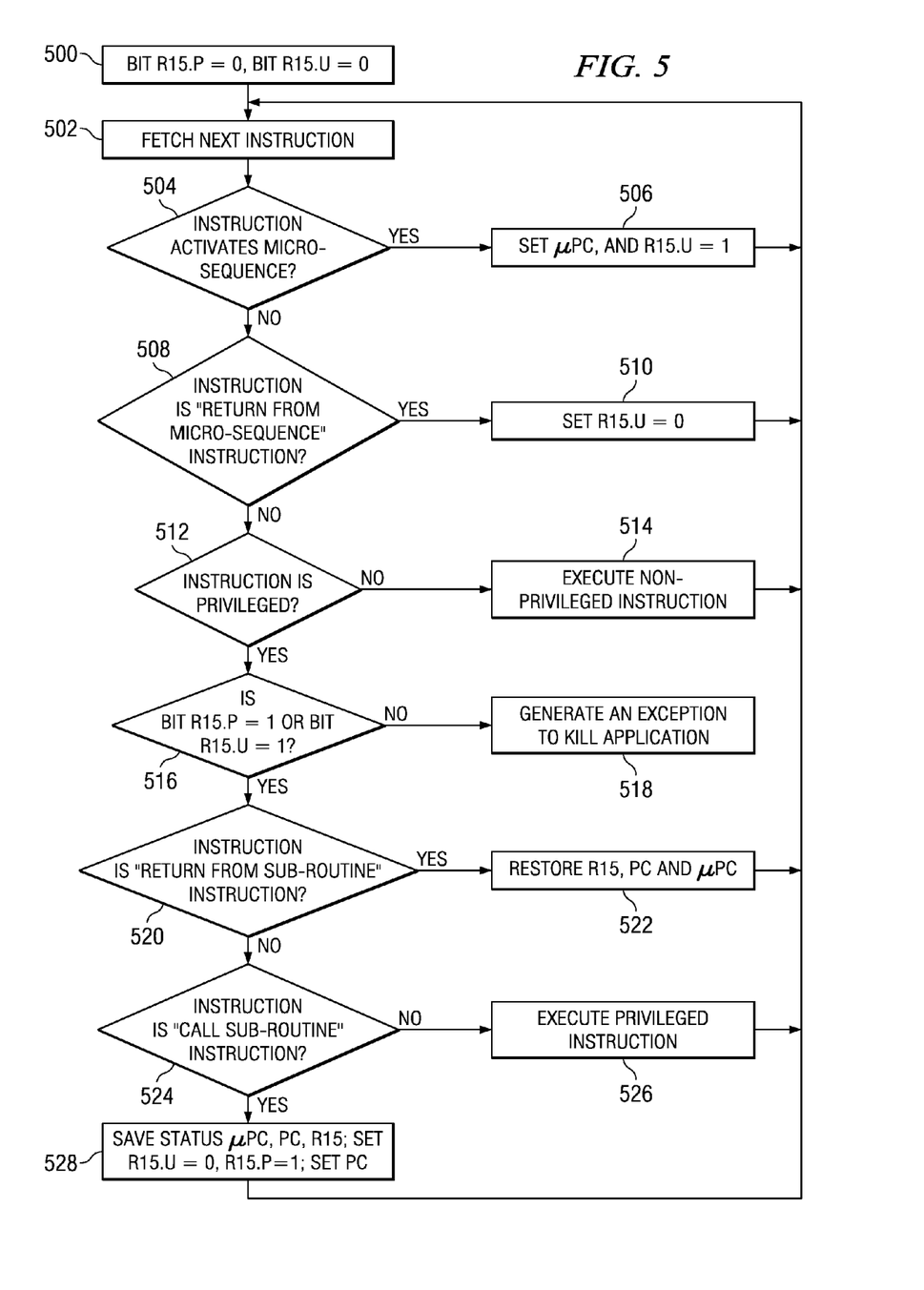
FIG. 5 illustrates a flow diagram of a method for implementing a security model in accordance with embodiments of the present disclosure.

Designing a security policy consists of designing a set of micro-sequences and JSM subroutines. The details of the security policy are not relevant here beyond the manner in which the security policy is implemented. Referring to FIG. 5, a flow diagram illustrates an embodiment of the application of the security model of the present invention on JSM. After the JSM boot time, the applications are executed with bit R15.P deasserted, indicating that execution is not in privilege mode (block 500). In block 502, JSM fetches instructions from PC (if U=0) or from micro-PC (if U=1). At block 504, a check is performed to determine if the instruction activates a micro-sequence (for example, by either a micro-sequenced bytecode, or a trap). If, at block 504, the instruction activates a micro-sequence, then micro-PC is set to the appropriate micro-sequence and bit R15.U is asserted (block 506). In this case, the JSM continues fetching new instructions at block 502. If, at block 504, the instruction does not activate a micro-sequence, a check may be performed to determine if the instruction is of a type that returns execution flow from a micro-sequence, referred to herein as a "RTUS," return from micro-sequence instruction (block 508). If the instruction is a RTUS type instruction, bit R15.U is cleared (block 510), and the JSM continues fetching new instructions in block 502.

At block 512, a check is performed to determine if the instruction is a privileged instruction, and if it is not a privileged instruction, the instruction is executed (block 514) and JSM continues fetching new instructions in block 502. In the case of a privileged instruction at block 512, a check is performed to determine the status of bits P and U (block 516). If bit R15.P is deasserted and bit R15.U is deasserted, an exception is generated to signal the security manager a fault (block 518). In the case of an authorized execution of a privileged instruction (i.e., if bit R15.P=1 or bit R15.U=1), additional checks are performed.

At block 520, a check is performed to determine if the instruction is a "return from subroutine" type instruction (i.e., "RETS"). If the instruction is a RETS instruction, atomically R15, PC and micro-PC are restored in block 522, and the JSM continues fetching new instructions in block 502. If the instruction is not a RETS instruction, a check is performed to determine if the instruction is a "call subroutine" type instruction (i.e., "CALLS) in block 524. If the instruction is not a call subroutine instruction (CALLS), the privileged instruction is executed (block 526), and JSM continues fetching new instructions in block 502. If the instruction is a CALLS instruction, the status of micro-PC, PC and R15 are saved atomically, bit R15.U is cleared, bit R15.P is asserted, and PC is set to the subroutine PC (block 528).

As shown on this diagram, the resulting effect is that a privileged instruction can only be executed when bit R15.P is asserted or bit R15.U is asserted. Because bit R15.P can only be set using a privileged instruction (i.e., CALLS), the only way to enter a privilege mode is using a micro-sequence (setting bit R15.U to 1). Thus, the micro-sequences can exclusively control access to privileged resources.

Figure 6:
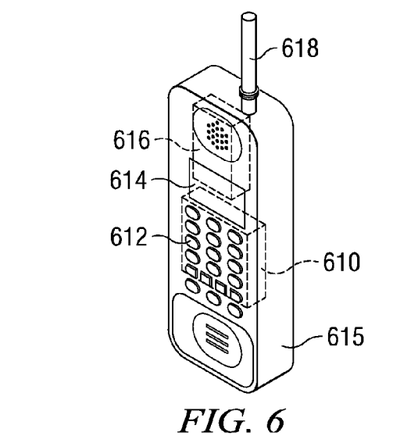
FIG. 6 depicts an illustrative embodiment of the system described herein.

System 100 may be implemented as a mobile cell phone such as that shown in FIG. 6. As shown, the mobile communication device includes an integrated keypad 612 and display 614. The JSM processor 102 and MPU processor 104 and other components may be included in electronics package 610 connected to the keypad 612, display 614, and radio frequency ("RF") circuitry 616. The RF circuitry 616 may be connected to an antenna 618.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. Each and every claim is incorporated into the specification as an embodiment of the present invention.

What is claimed is:

1. A method, comprising:
    defining a micro-sequence based security policy;
    determining whether an instruction accesses a privileged resource, wherein a bit R15.P in a status register indicates that execution is occurring in privilege mode and a bit R15.U in a status register indicates that execution is occurring by way of a micro-sequence; and
    when a processor is not executing a micro-sequence and not already in privilege mode, applying the micro-sequenced based security policy to the instruction to control access to the privileged resource according to the security policy.

2. The method according to claim 1, further comprising defining the security policy in a micro-sequence.

3. The method according to claim 2, wherein a micro-sequence comprises a series of complementary instructions, other than standard Java™ instructions, executed by a Java Stack Machine (JSM) to replace a bytecode for more efficient execution.

4. The method according to claim 1, further comprising defining the security policy in a subroutine, the execution of which is started by execution of a micro-sequence.

5. The method according to claim 4, wherein a micro-sequence comprises a series of complementary instructions, other than standard Java™ instructions, executed by a Java Stack Machine (JSM) to replace a bytecode for more efficient execution.

6. The method according to claim 1, further comprising examining a bit R15.P in a status register to determine when execution is occurring in privilege mode.

7. The method according to claim 1, further comprising examining a bit R15.U in a status register to determine when execution is occurring by way of a micro-sequence.

8. The method according to claim 1, further comprising compiling a software application for the security policy.

9. The method according to claim 1, wherein the privileged resource comprises at least one of a privileged application and a privileged hardware resource.

10. The method according to claim 1, further comprising generating an exception when an instruction attempts a privileged access when the instruction does not activate a micro-sequence and when not already in privilege mode.

11. An apparatus including a processor, comprising:
an active program counter selected from among either a first program counter and a second program counter;
a security manager logic that, based on an attempt by an instruction to access a privileged resource, applies a micro-sequence based security policy to control access to the privileged resource when the processor is not already in privilege mode and not executing a micro-sequence;
wherein the active program counter switches between the first and second program counters while the security manager applies the security policy; and
wherein the security manager logic generates an exception when an instruction attempts a privileged access when the instruction does not activate a micro-sequence and when not already in privilege mode.

12. The apparatus of claim 11, wherein the active program counter again switches between the first and second program counters when application of the micro-sequence based security policy is complete.

13. The apparatus of claim 11, wherein the security policy is defined in a micro-sequence.

14. The apparatus of claim 11, wherein the security policy is defined in a subroutine, the execution of which is started by execution of a micro-sequence.

15. The apparatus of claim 11, wherein a bit R15.P in a status register indicates that execution is occurring in privilege mode.

16. The apparatus of claim 11, wherein a bit R15.P in a status register indicates that execution is occurring by way of a micro-sequence.

17. The apparatus of claim 11, wherein the privileged resource comprises at least one of a privileged application and a privileged hardware resource.

18. The apparatus of claim 11, wherein the security manager logic generates an exception when an instruction attempts a privileged access when the instruction does not activate a micro-sequence and when not already in privilege mode.

19. A system, comprising:
a first processor; and
a second processor coupled to said first processor, said second processor comprising:
an active program counter selected from among either a first program counter and a second program counter;
a security manager logic that, based on an attempt by an instruction to access a privileged resource, applies a micro-sequence based security policy to control access to the privileged resource when the second processor is not already in privilege mode and not executing a micro-sequence;
wherein the active program counter switches between the first and second program counters while the security manager logic applies the security policy; and
wherein the security manager logic generates an exception when an instruction attempts a privileged access when the instruction does not activate a micro-sequence and when not already in privilege mode.

20. The system according to claim 19, wherein the active program counter again switches between the first and second program counters when application of the micro-sequence based security policy is completed.

21. The system according to claim 19, wherein the security policy is defined in a micro-sequence.

22. The system according to claim 19, wherein the security policy is defined in a subroutine, the execution of which is started by execution of a micro-sequence.

23. A system, comprising:
a first processor; and
a second processor coupled to said first processor, said second processor comprising:
an active program counter selected from among either a first program counter and a second program counter;
a security manager logic that, based on an attempt by an instruction to access a privileged resource, applies a micro-sequence based security policy to control access to the privileged resource when the second processor is not already in privilege mode and not executing a micro-sequence;
wherein the active program counter switches between the first and second program counters while the security manager logic applies the security policy; and
wherein a bit R15.P in a status register indicates that execution is occurring in privilege mode and a bit R15.U in a status register indicates that execution is occurring by way of a micro-sequence.

24. The system according to claim 19, wherein the privileged resource comprises at least one of a privileged application and a privileged hardware resource.

25. The system according to claim 19, wherein the system comprises a communications device.

26. A method, comprising:
selecting an active program counter from among a first program counter and a second program counter;
applying a micro-sequence based security policy via security manager logic to control access to a privileged resource in response to an attempt by an instruction to access the privileged resource when a processor is not already in privilege mode and not executing a micro-sequence;

switching between the first and second program counters while the security manager applies the security policy; and generating an exception when an instruction attempts a privileged access when the instruction does not activate a micro-sequence and when not already in privilege mode.

* * * * *